July 3, 1928.
A. S. TUTTLE
1,675,626
RADIO BATTERY CHARGING CABINET
Filed July 24, 1926
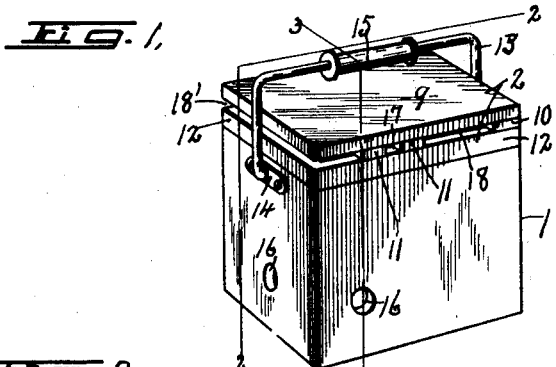
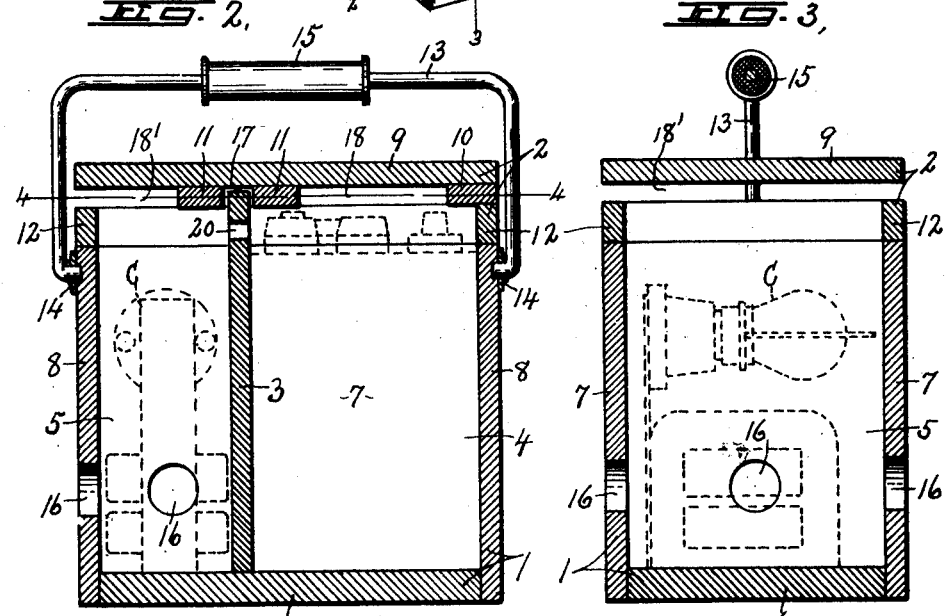
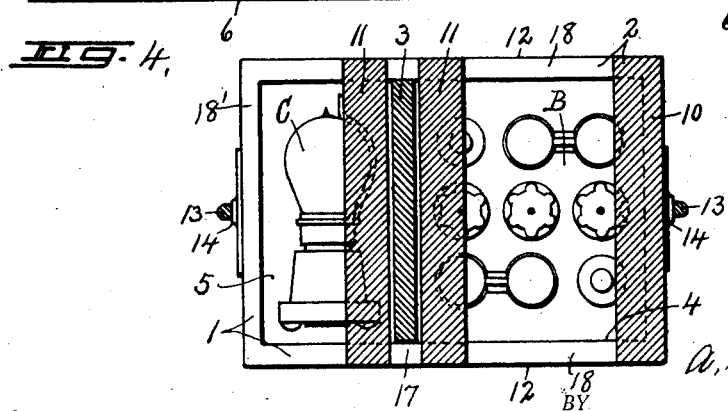
WITNESS
H. V. Hurst
INVENTOR.
A. S. Tuttle
BY
Denison & Thompson
ATTORNEYS Patented July 3, 1928.

1,675,626

UNITED STATES PATENT OFFICE.

ARTHUR S. TUTTLE, OF SHERBURNE, NEW YORK.

RADIO BATTERY-CHARGING CABINET.

Application filed July 24, 1926. Serial No. 124,658.

This invention relates to a radio set consisting of a combined storage battery and charger therefor and, therefore, more particularly to the construction of the case or container for receiving the battery and charger as a unitary article of manufacture in which the interior of the case is divided by a suitable partition into separate upright compartments for receiving respectively the battery and charger.

The main object is to protect the battery and charger against accumulations of dust and other foreign matter and also against contact with external objects and at the same time to allow free circulation of air through both cells for ventilating the battery cell from gases which may be liberated from the battery and at the same time to ventilate the heated air from the charging cell produced by the energizing of the charger thereby reducing the liability of escape of the gases from the battery to the charging cell or the passage of the heat from the charging cell into the battery cell, all of which contribute materially to the life and efficiency of both the battery and the charger.

One of the specific objects is to construct the cover or lid in such manner as to extend across the entire area of the top of both cells and at the same time to afford lateral exit openings for the escape of gases and heated air.

Other objects and uses relating to specific parts of the apparatus will be brought out in the following description.

In the drawings:—

Figure 1 is a perspective view of a radio set embodying the various features of my invention.

Figure 2 is an enlarged longitudinal vertical sectional view taken on line 2—2, Figure 1.

Figure 3 is an enlarged transverse vertical sectional view taken on line 3—3, Figure 1.

Figure 4 is a horizontal sectional view taken in the plane of line 4—4, Figure 2.

The case or container comprises a rectangular box —1— and a lid or cover —2—, both of which are preferably made of wood or other insulating material treated in such manner as to render them acid-proof, waterproof and weather-proof, the interior of the cell being divided by a transverse partition —3— into two compartments —4— and —5— for receiving a storage battery —B— and a charger —C— respectively.

The box —1— comprises a bottom wall —6—, opposite upright side walls —7— and opposite upright end walls —8— permanently secured at their junctions one to the other to form a rigid structure while the partition —3— is permanently secured to the opposite side walls —7— and to the bottom wall —6— at right angles thereto and extends some distance above the upper edges of the side and end walls as shown in Figure 2, said partition being located at one side of the transverse center of the box so that the cell —4— for receiving the battery is somewhat larger than the cell —5— in which the charger is located.

The lid —2— is of sufficient area to cover the upper ends of both of the cells —4— and —4— and comprises a top portion —9—, cleats —10— and —11— secured to the underside of the top portion —9— and a marginal flange —12— secured to the underside of the cleats —10— and —11— and projecting downwardly therefrom to form with the top portion —9— an inverted box-like structure adapted to rest upon the upper edges of the sides —7— and ends —8— when in operative position but capable of being removed and replaced at will when desired.

A bail —13— has its opposite ends pivotally mounted in suitable bearings —14— on the opposite ends —8— of the box near the upper edges thereof and midway between the sides —7— and its intermediate portion provided with a handle —15— by which the entire set may be carried from place to place when necessary.

The outer end wall —8— and opposite side walls of the cell —5— are provided with openings —16— for the circulation of air from the exterior into the charger cell —5—, said openings being preferably located near the bottom of the cell for the reception of the cooler air from the outside which upon entrance to the cell is heated and rises to the top thereof.

The cleat —10— is located near one end of the top —9— while the cleats —11— are arranged in longitudinally spaced relation to form a transverse groove —17— for receiving the upper edge of the partition —3—.

The lower and upper edges of the flanges —12— are parallel with each other and with the lower and upper faces of the top portion —9— which is spaced apart from the upper edges of the flanges —12— a distance corresponding to the thickness of the cleats —10— and —11—.

The cleats —10— and inner cleat —11— over the cell —4— are arranged in longitudinally spaced relation to form lengthwise openings —18— in opposite sides of the cover between the top portion —9— and upper edges of the side flanges —12— to allow the escape of ventilation of any gases or heated air which may tend to accumulate in the battery cell.

The cleat —11— over the charger cell —5— is arranged in spaced relation to the corresponding end flange —12— so as to form another vent opening —18'— extending through opposite sides and the outer end of the cover —2— directly over the cell —5— to allow the escape of heated air or gases which may tend to accumulate in said cell.

The partition —3— is also provided with a lengthwise opening —20— between the upper edge thereof and the upper edge of the box —4— to permit the circulation of air and gases therethrough and thence through the openings —18— and —18'— as may be necessary to free the battery cell from gases and also to reduce the liability of overheating of the air in the cell —5—.

It will be noted that the cleats —11— are located in close proximity to opposite end faces of the partition —3— and serve to hold the cover —2— against endwise displacement.

The upper end of the partition —3— extends between the opposite side walls or flanges —12— of the cover —2— in close proximity thereto as shown in Figures 2 and 4 to hold the cover against accidental transverse displacement.

The space between the upper face of the lid —9— and overlying portion of the bail —13— is sufficient to allow the cover —2— to be lifted above the upper edge of the partition —3— and then removed or replaced laterally when desired.

Operation.

When the battery —B— and charger —C— are installed in their respective compartments and the cover —9— is placed in operative position the gases escaping from the battery find a ready passage to the atmosphere through the passages —18— while the heated air developed by the charger is free to escape through the openings —18'— or through the passage —20— in the partition —3— and thence outwardly over the top of the battery through the passages —18—, the displacement of the heated air from the top being replaced by the cooler air entering the openings —16— so that when the charging outfit is in operation the ventilation of both cells is entirely automatic.

The battery charger —C— may be of any standard construction but is preferably arranged to automatically keep the battery charged to a substantially constant E. M. F.

What I claim is:

In a device of the class described, a box, a cover for the box, a transverse partition dividing the interior of the box into two compartments, a plurality of holes in the outer sides of one of said compartments located below the horizontal center of the box, open spaces between the cover and the top of the outside walls of said compartment, open spaces between the cover and the opposed outside walls of the other compartment, and a lengthwise opening in the top of the partition constituting the only means of communication between the compartments.

In witness whereof I have hereunto set my hand this 14th day of July, 1926.

ARTHUR S. TUTTLE.